Dec. 19, 1922.

A. WEISBERG.
TIRE ARMOR.
FILED SEPT. 2, 1922.

Aaron Weisberg, INVENTOR.

BY Geo. P. Kimmel ATTORNEY.

Dec. 19, 1922.
A. WEISBERG.
TIRE ARMOR.
FILED SEPT. 2, 1922.
1,439,590.
2 SHEETS—SHEET 2.
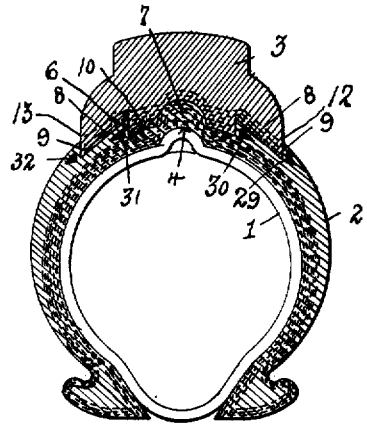
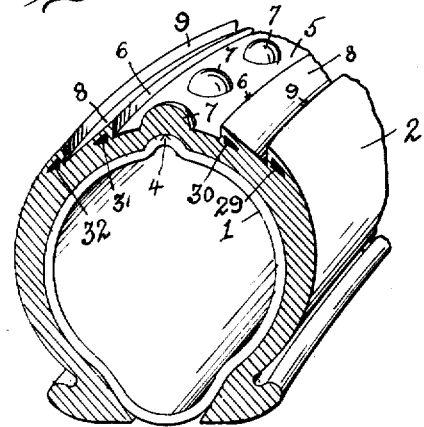
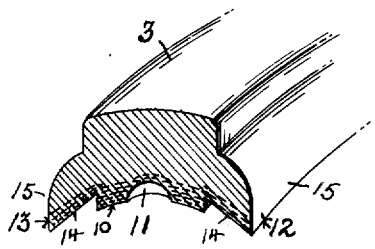
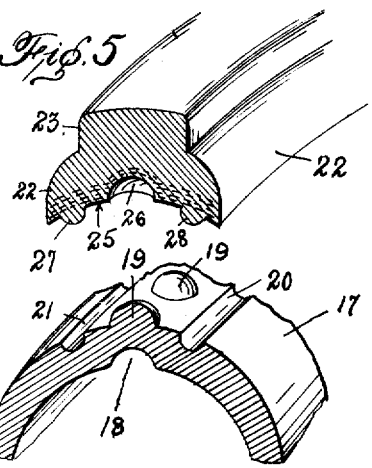
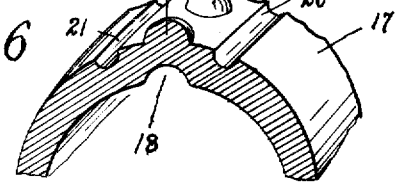
INVENTOR.
AARON WEISBERG,
BY
Geo. P. Kimmel.
ATTORNEY Patented Dec. 19, 1922.

1,439,590

UNITED STATES PATENT OFFICE.

AARON WEISBERG, OF BROOKLYN, NEW YORK.

TIRE ARMOR.

Application filed September 2, 1922. Serial No. 585,920.

*To all whom it may concern:*

Be it known that I, AARON WEISBERG, a citizen of the United States, residing at Brooklyn, in the county of Kings and State of New York, have invented certain new and useful Improvements in Tire Armor, of which the following is a specification.

This invention relates to tires of the pneumatic type for motor vehicles, and has for its object to provide a tire of such class, with means in a manner as hereinafter set forth, to provide a detachable tread element for increasing the life of the outer shoe of the tire, and which when worn can be conveniently removed and a new one substituted and mounted on the outer shoe, under such conditions, preventing the discarding of the outer shoe, whereby the life of the latter is enhanced thereby providing for a considerable saving in expense in tire equipment.

A further object of the invention is to provide, in a manner as hereinafter set forth, a tire including an outer shoe having a removable tread element, said shoe and element provided with inherent means to prevent the circumferential movement of the tread element with respect to the shoe, and the latter having inherent means associating with the inner tube of the tire to prevent the shifting of said tube circumferentially with respect to the shoe.

A further object of the invention is to provide a tire of the class referred to, in a manner as hereinafter set forth, and including an outer shoe and a removable tread element therefor, said shoe and element having inherent means to prevent the circumferential movement of the element with respect to the shoe and said element having its tread surface formed with integral antiskidding means.

Further objects of the invention are to provide a tire of the class referred to, in a manner as hereinafter set forth, and which is comparatively simple in its construction and arrangement, strong, unusually durable, efficient in its use, conveniently set up and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:—

Figure 2 is a cross sectional view of the tire, Figure 3 is a fragmentary view, in cross section, of the outer shoe, Figure 4 is a fragmentary view, in cross section, of the removable tread element.

Figure 5 is a like view, of a modified form of tread element,

Figure 6 is a fragmentary view, in section, of a modified form of the outer shoe.

Figure 1:
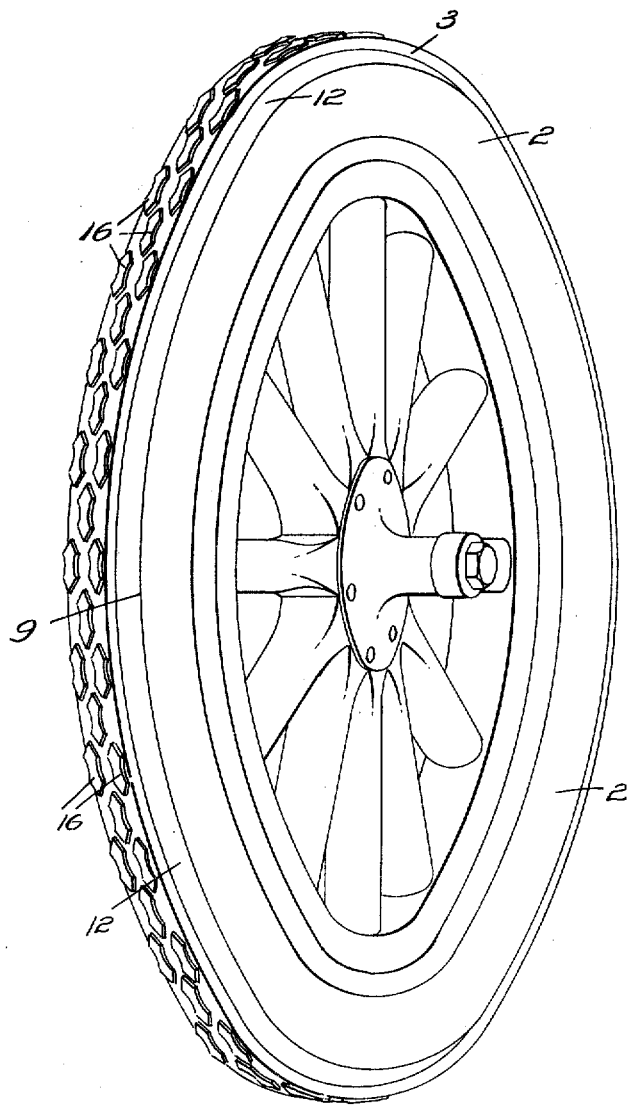
Figure 1 is a perspective view illustrating the wheel of a motor vehicle, showing the adaptation therewith of a tire in accordance with this invention.

A tire of the pneumatic type, in accordance with this invention, comprises an outer shoe, a removable tread element detachably mounted thereon and an inner tube, and referring to Figures 1 to 4 of the drawings, 1 denotes the inner tube which is of known construction, 2 the outer shoe of the clencher type, and 3 the removable tread element which is detachably mounted on the tread portion of the outer shoe 2.

The inner face of the outer shoe 2, at the tread portion of said shoe, is formed throughout with a series of spaced cavities 4, and which are positioned centrally with respect to the inner face of the tread portion of the shoe 2. The tread portion of the outer shoe, is formed centrally with a circumferentially extending groove 5, the walls of which are indicated at 6, and which are flat. Centrally of the bottom of the groove 5, spaced protuberances 7 are provided and which extend throughout said bottom, and that is to say, extend circumferentially of the outer shoe 2. At each side of the groove 5, the outer face of the shoe 2, is formed with a circumferentially extending channel having a downwardly and inwardly extending bottom 8, and a vertically extending outer wall 9, forming a substantially V-shaped channel. The walls of bottom 8, of each of the channels are oppositely disposed with respect to each other and merge into the side wall 6 of the grooves 5.

The tread member 3 formed from a solid body of resilient material, is annular in contour and substantially rectangular in cross section and has its inner face conforming in contour to the contour of the bottom of the groove 5. The lower face of the tread element 3, and which is indicated at 10, is formed throughout with a series of spaced cavities 11, which are adapted to receive the protuberances 7, when the tread element 3 is mounted on the tire shoe 2, so as to prevent circumferential movement of the element 3 with respect to the shoe 2. The tread element 3, at each side thereof, is formed with an annular tapering projection and the said projections are indicated at 12, 13, and extend in opposite directions with respect to each other. The inner face 14, of each of the projections, is formed in contour to the bottom of the wall 8, of the channel and the inner portion 15, of the outer face of each of the projections conforms in contour to the wall 9 of the channels. When the tread element 3, is mounted on the shoe 2, it extends into the groove 5, and with the protuberances 7, of the shoe seating in the cavities 11, this prevents as before stated, circumferential movement of the tread element 3, with respect to the shoe 2, and when the tread element 3, is mounted on the shoe 2, the projections 12, 13, extend into the channels at the sides of the groove 5 so as to prevent lateral movement of the tread element 3, with respect to the shoe 2.

The tread surface of the element 3 is provided with any suitable form of arrangement of anti-skidding devices 16.

Referring to Figures 5 and 6, of the drawings, in which is shown a modified form of tread element and tire shoe, the latter is indicated at 17, and has its inner face, of the tread portion thereof, formed with spaced cavities 18, which are disposed throughout the inner face of the shoe 17, centrally thereof. The tread surface of the shoe 17, centrally thereof, is formed with a series of spaced protuberances 19, which are disposed circumferentially of the shoe 17, and at opposite sides of the protuberances 19, as well as being spaced therefrom, are circumferentially extending channels 20, 21, which are formed in the outer face of the shoe.

The tread element shown in Figure 5, as indicated at 22, is formed from a solid body of resilient material substantially arcuate in cross section, and provided with an integral extension 23, disposed throughout the element 22, and which is substantially rectangular in cross section. The inner face of the element 22, conforms in contour to the periphery of the tread portion of the shoe 17, and the said inner face is indicated at 25, and is provided centrally as well as throughout with spaced cavities 26, for the reception of the protuberances 19, on the shoe 17. At opposite sides of the protuberances 26, as well as being spaced therefrom, the inner face 25, of the element 22, is formed with continuous ribs or projections and which are indicated at 27, 28, and the said ribs 27, 28, conform in contour to the shape of the channels 20, 21.

When the element 22, is mounted on the outer shoe 17, the protuberances 19, engaging in the cavities 26, prevent circumferential movement of the element 22, with respect to the shoe 17, and when the element is mounted in the position as stated, the ribs 27, 28, engage in the channels 20, 21, and prevent lateral shifting of the element 22, with respect to the shoe 17.

The inner tube 1, when inflated, has portions thereof extending into the cavities 4, or the cavities 18, and by this provision, circumferential movement of the tube 1, is prevented with respect to the shoe 2.

By setting up a tire, in a manner as hereinafter referred to, with a removable tread element, when the latter becomes worn, it can be conveniently removed and a new one substituted, under such conditions overcoming the necessity of discarding the outer shoe, thereby enhancing the life of the latter and reducing tire expenses, and the tire furthermore provides means to prevent circumferential movement of the inner tube, under such conditions increasing the life of the latter, as wear is reduced between the outer periphery of the inner tube of the inner face of the shoe 1.

The outer shoe 2, at the tread portion thereof, is provided with a series of reenforcing members 29, 30, 31 and 32, which may be formed of rubber, fabric or cord, and the reenforcing members 30, 31, are arranged adjacent to the side walls 6 of the groove 5, and the reenforcing members 29, 32, are arranged adjacent to the walls 9 of the channels. These reenforcing members act as means to maintain the walls 9, as well as walls 6 vertically.

Although the preferred embodiment of the invention is as illustrated taken in connection with the accompanying description, but it is to be understood that changes in the details of construction can be resorted to, without departing from the spirit of the invention.

What I claim is:—

1. A pneumatic tire comprising an outer shoe provided with peripheral projections and peripheral channels, a detachable tread element mounted thereon and provided with cavities and projections, said cavities receiving said protuberances to prevent circumferential shifting of said element with respect to the shoe, and said projections extending in said channels to prevent lateral shifting of said element with respect to the shoe, said outer shoe further provided with interiorly arranged cavities and an inner tube mounted in said shoe and adapted to have portions thereof extend into said inner cavities to prevent circumferential movement of the tube with respect to the shoe.

2. A pneumatic tire comprising an outer shoe having its tread portion formed with a circumferentially extending groove and further formed with a circumferentially extending channel at each side of the groove, protuberances formed on said shoe and arranged within said groove, a removable tread element seated in said groove and having its inner face provided with cavities for the reception of said protuberances, and said tread element furthermore provided with oppositely extending projections engaging in said channels, said outer shoe furthermore provided in its inner face with spaced cavities, and an inner tube mounted in said shoe and adapted to have portions thereof extend into said inner cavities to arrest circumferential movement of the tube with respect to the shoe.

In testimony whereof, I affix my signature hereto.

AARON WEISBERG.